3,663,487
METHOD OF MAKING VINYL-MODIFIED SYNTHETIC RESINS, BASED ON POLYETHER ESTERS, WHICH ARE CAPABLE OF BEING THINNED WITH WATER
Bernhard Broecker, Hamburg, Germany, assignor to Reichhold-Albert-Chemie Aktiengesellschaft
No Drawing. Filed Nov. 16, 1970, Ser. No. 90,079
Claims priority, application Switzerland, Nov. 17, 1969, 17,041/69
Int. Cl. C08f 19/14; C09d 3/58, 5/02
U.S. Cl. 260—23 EP
4 Claims

ABSTRACT OF THE DISCLOSURE

The invention consists in a method of making vinyl-modified synthetic resins, based on polyether-esters, which are capable of being thinned with water, and which have valuable properties.

BACKGROUND OF THE INVENTION

Synthetic resins based on esters of fatty acids and compounds containing epoxide groups have been found extremely satisfactory as binding agents for surface protection (see Paquin, Epoxide Compounds and Epoxide Resins, page 416, Springer Verlag, Berlin, Göttingen, Heidelberg 1958).

The present invention is concerned with making water-soluble vinyl-modified synthetic resins based on polyether ester. Earlier synthetic resins capable of being thinned with water have the great disadvantage that they are not stable when stored in aqueous solution. The pH value of the neutralized products shifts into the acid range during storage, whereby components that are insoluble in water are formed.

The aim of this invention is to make available water-soluble synthetic resins of this kind which are distinguished by extreme stability in the alkaline medium and can be made relatively economically.

SUMMARY OF THE INVENTION

The invention consists in a method of making vinyl-modified synthetic resins, based on polyether-esters, which are capable of being thinned with water, characterised in that (a) Compounds which contain epoxide groups and which may also contain hydroxyl groups and are represented by the general formula

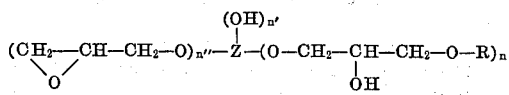

wherein (I) Z means an alkyl, aryl or cycloalkyl residue and $n$ has the value zero and $n''$ the value 1 or 2 or 3, and $n'$ can assume the values zero, 1 or 2 or (II) Z means an alkyl, aryl or cycloalkyl residue and $n$ and $n''$ have the value 1, R representing an alkyl residue with 1 to 6 C atoms, or (III) Z means the residue of the following formula

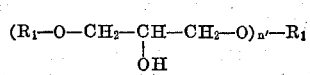

when $n$ has the value zero and $n''$ the value 2, $R_1$ representing an aliphatic or aromatic divalent residue and $n_1$ meaning zero or a small number between 1 and 5, are etherified with (b) Saturated primary and/or secondary monohydric alcohols with 3 to 20 C atoms by heating, in the presence of catalysts if required, and (c) The etherification products are esterified with an unsaturated aliphatic monocarboxylic acid with 6 to 20 C atoms which preferably contains a plurality of ethylenic double bonds, or with a mixture of such acids, and (d) The esterification products are (possibly for blocking the hydroxyl group with acid anhydrides or with mono- and/or polyisocyanates) reacted by heating with such quantities for $\alpha,\beta$-ethylenically unsaturated mono- and/or polycarboxylic acids and, when they exist, anhydrides of these acids and/or semiesters obtained by reaction of these acids with monoalcohols having 1 to 4 C atoms, in the presence of other vinyl or vinylidene compounds if required, that the reaction products have an acid value of at least 25, and (e) The reaction products containing carboxylic groups are subsequently treated with such quantities of ammonia and/or strong organic nitrogen bases that the products are completely or partly neutralized and these reaction products are sufficiently capable of being dispersed in water or thinned with water.

Swiss patent specification 456,814 and 466,580 describe stoving lacquers capable of being thinned with water which are made by a process in which products of reactions between epihalogenhydrins and polyphenols, which are free from epoxides, are made to react with anhydrides or di- or polybasic organic acids. In this process, however, the carboxylic groups which are necessary for solubility of the product in water are not present during polymerization but are introduced by esterification. In contradistinction to this, the product of the present invention contain the carboxylic groups in a form in which they are present during polymerization, which leads to a substantial improvement in the resistance of these products to saponification, so that the carboxyl groups are combined with the resin molecule via a carbon-carbon-bond.

U.S. patent specification 3,293,201 describes a water-soluble air-drying binding agent which is obtained by reaction of an oleo-maleic acid anhydrides adduct with the ester of an epoxide resin with an unsaturated fatty acid. This product also is insufficiently stable in an alkaline aqueous solution. In contradistinction to this the synthetic resins of the present invention are distinguished by very great stability in alkalin aqueous solution.

PREFERRED EMBODIMENTS OF THE INVENTION

Compounds which contain epoxide groups and may also contain hydroxyl groups and are suitable for the synthesis of the reaction products are epoxidated olefines, diolefines and oligoolefines such as 1,2,5,6-diepoxyhexane and 1,2,4,5-diepoxyhexane. Polyethers with epoxy groups as obtained by etherification of a dihydric alcohol or diphenol with epihalogenhydrins or dihalogenhydrins, for instance epichlorhydrin or dichlorhydrin, in the presence of alkali are very suitable. These compounds are derived from glycols such as ethylene glycol, diethylene glycol, triethylene glycol, propylene glycol-1,2, propylene glycol-1,3, butylene glycol-1,4, pentane diol-1,5, hexane diol-1,6, and more particularly from diphenols such as resorcine pyrocatechine, hydroquinone, 1,4-dihydroxynaphthalene, bis-(4-hydroxy-phenyl) - methane, bis - 4-(hydroxy-phenyl)-methyl-phenylmethane, bis - (4-hydroxy-phenyl-toluyl)-methane, 4,4-dihydroxy-diphenyl and 2,2-bis-4-hydroxy-phenyl-propane. The compounds in the form of polyethers which contain epoxide groups are represented by the following general formula

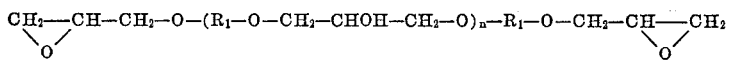

In this formula $R_1$ means an aliphatic or aromatic carbon residue and $n$ means zero or a small number, for instance 1 to 5.

Polyethers containing epoxide groups and represented by the general formula

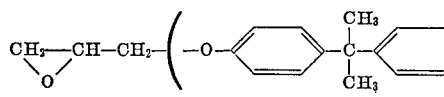 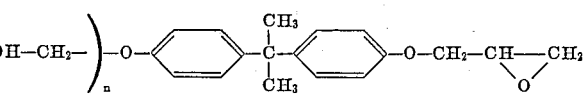

and based on 2,2-bis-(4-hydroxy-phenyl)-propane as the starting compound, are of great importance; of these, those polyethers which have a molecular weight between about 380 and about 3500 are preferably used.

Saturated primary and/or secondary monoalcohols are used for etherifying these compounds containing epoxide groups.

Suitable saturated alcohols are for instance methanol, ethanol, propanols, butanols, pentanols, hexanols, heptanols, octanols and nonanols. The preferred alcohols are primary alcohols; of these, ethanol, propanol and butanol are preferred. Tertiary monoalcohols are not suitable for this reaction.

In this operation the etherification is carried out by heating, preferably in the presence of catalyst in such a manner that the hydroxyl groups of the saturated monoalcohols are in excess of the epoxide groups of the epoxidic compounds. When the saturated monoalcohols are volatile it is advisable to operate with a very considerable excess of about 2 hydroxyl groups up to 20 hydroxyl groups per epoxide group, favoured 10-20 hydroxyl groups per epoxide group in the reaction and then remove the excess of unreacted saturated alcohol, for instance by distillation. In the case of non-volatile saturated alcohols it is advantageous to make the excess not so great. In this case however there should be at least 1.2 hydroxyl groups of the saturated monoalcohols for each epoxide group. In principle it is in fact also possible to operate with quantitative ratios of the saturated alchols and the compounds containing epoxide groups such that one epoxide grougs is used for each hydroxyl group of the saturated moonalcohol or the epoxide groups are present even in excess over the hydroxyl groups of the saturated monoalcohols in some case. But in the case of quantitative ratios of the last-mentioned kind very highly viscous products are generally obtained and the danger that the resins may form a gel is not excluded with sufficient certainty.

Etherification is carried out by heating the above-mentioned components $a$ and $b$ to temperatures between about 40 and about 150° C.; the temperature range from 60 to 120° C. is preferred. Known etherification catalysts are preferably used in the operation such as boron trifluoride adducts, for instance boron trifluoride diethylether, organic tin compounds such as dibutyl tin dilaurate and strong organic bases, for instance trimethyl benzyl ammonium hydroxide, are examples of catalysts which can be used for this purpose.

The etherification products obtained in this reaction must also be soluble in organic solvents such as methyl isobutyl ketone, xylene, toluene and glycol ethers such as butyl glycol and isobutyl glycol. The etherification can be carried out in the absence of solvents, but the presence of inert organic solvents is permissible.

The polyethers thus obtained are subsequently esterified with unsaturated aliphatic monocarboxylic acids which have 6 to 20 C atoms and preferably contain several ethylenic double bonds. Suitable unsaturated aliphatic carboxylic acids are straight chain unsaturated fatty acids with 10 to 20 carbon atoms such as palmitoleic acids, petroselinic acid, oleic acid, elaidic acid, 9,12-linoleic acid, 9,11-linoleic acid (in the cis, cis-trans and trans-trans form), linolenic acid, eleostearic acid, lignoceric acid, erucic acid, arachidonic acid, clupanodonic acid, $\alpha$-parinaric acid, $\alpha$-licanic acid and anhydrides thereof; one of these or a mixture of more than one may be used. Fatty acid mixtures as obtained from natural vegetable and animal fats such as cottonseed oil, peanut oil, wood oil, maize oil, oiticica oil, olive oil, poppy-seed oil, isano oil, olive kernel oil, perilla oil, rape oil, sunflower oil, walnut oil, grapeseed oil, sardine oil, herring oil, menhaden oil, whale oil and more particularly linseed oil, soy bean oil and safflower oil, are preferably used.

It is also possible to use commercial fatty acids, more particularly tall oil aliphatic acids, chemically treated fatty acids or fatty acids from chemically treated fats, more particularly dehydrated castor oil fatty acids, or conjugated fatty acids treated by catalytic methods, fatty acids from catalytically conjugated fats, more particularly conjugated linseed oil, soy bean oil and safflower oil fatty acids, fatty acids elaidenated by catalytic methods or fatty acids from elaidenated fats.

Excellent results are obtained with what are known as commercial linoleic acids which are obtained by distillation and are distinguished by a high linoleic acid content (more than 50 percent by weight), a small saturated fatty acid content (less than 10 percent by weight), and only a very small linoleic acid content (less than 2 percent by weight).

The esterification is carried out by heating; in this operation the removal of the reaction water can be accelerated by the addition of carrier agents such as xylene, toluene or benzene or by operation under reduced pressure. The esterification takes place in the presence of known etherification catalysts as Friedel-Crafts catalysts such as for instance boron trifluoride or in the presence or organic tin compounds such as dibutyl tin dilaurate. The quantity of monocarboxylic acids is so chosen that the equivalent ratio of the carboxylic groups of the monocarboxylic acids to the hydroxyl groups of the epoxide resin ether amounts to between 0.5 and 0.9. The esterification is continued until the acid value has reached about 5.

The fatty acid content in the end product should be not less than 20% by weight and not more than 60% by weight; the preferred range is between 25 and 55% by weight.

The polyether esters thus obtained are subsequently copolymerized with $\alpha,\beta$-ethylenically unsaturated mono- and/or polycarboxylic acids while hot. In this operation it is also possible to copolymerize a mixture of these substances with other vinyl or vinylidene monomers which contain no carboxyl groups. Vinyl monomers which contain no carboxyl groups and can be used in the copolymerization process are alkyl esters of $\alpha,\beta$-unsaturated monocarboxylic acids, such as methyl acrylate, ethyl acrylate, propyl acrylate, butyl acrylate, octyl acrylate, 2-ethylhexyl acrylate, decyl acrylate; lauryl acrylate and the corresponding methyl, ethyl and phenyl acrylates, propyl crotonate, butyl crotonate and the like. It is also possible to use hydroxyalkyl esters of $\alpha,\beta$-unsaturated carboxylic acids, such as 2-hydroxy ethyl acrylate, 2-hydroxypropyl acrylate, 2-hydroxybutyl acrylate, 3-hydroxybutyl acrylate, 6-hydroxyhexyl acrylate and the corresponding methacrylates, etheracrylates and phenyl acrylates, 2-hydroxyethyl maleate, di-(2-hydroxypropyl)-maleate and the corresponding fumarates, 2-hydroxy-3-chloropropyl acrylate, 2-hydroxy-1-phenylethyl acrylate, 2-hydroxy-3-butoxypropyl acrylate and the corresponding ethacrylates and phenyl acrylates but there are still other copolymerizable vinyl and vinylidene compounds, such as styrene, nucleus-substituted styrenes and side-chain substituted styrenes such as α-methyl styrene, α-ethyl styrene and α-chlorostyrene, which can be used. Of these monomers, those that are preferably used are methyl acrylate, methyl methacrylate, ethyl acrylate, ethylmethacrylate, 2-hydroxyethyl acrylate, 2-hydroxypropyl acrylate and styrene, α-methyl styrene and vinyl toluene; one of these or a mixture of more than one may be used.

Suitable copolymerizable monomers containing carboxylic groups are acrylic acid, methacrylic acid, cinnamic acid, β-benzoyl acrylic acid and crotonic acid; also, α,β-ethylenically unsaturated polycarboxylic acids, and anhydrides of these when such anhydrides can be formed, such as maleic acid, fumaric acid, citraconic acid, itaconic acid, mesaconic acid and aconitic acid, monoesters of the aforesaid polycarboxylic acids with saturated straight chain monoalcohols with 1 to 4 carbon atoms, preferably methanol, maleic monomethyl ester and halogen-substituted acids such as chloromaleic acid and the like. Preferred α,β-ethylenically unsaturated carboxylic acids are acrylic acid, methacrylic acid, maleic acid anhydride, maleic acid and fumaric acid.

One of the copolymerizable monomers containing carboxylic groups, a mixture of more than one of these monomers, a mixture of one of these monomers with the initially mentioned monomers containing no carboxylic groups or a mixture of more than one with those containing no carboxylic groups, may be made to react with the ether ester from Stage (c).

Other copolymerizable monomers such as acrylamide, methacrylamide, acrylonitrile, methacrylonitrile and the like, or a mixture of more than one of these, may be introduced as an additive into the monomer mixture. The vinyl and/or vinylidene content in the synthetic resin depends on the intended range of use of the binding agent. But this content should generally be not less than 10% by weight, with respect to the weight of the end product. End products containing 10 to 30% by weight of copolymerized vinyl and/or vinylidene compounds are particularly suitable for lacquer coating media applied by the electrophoretic application method. In binding agents of this kind it is necessary to make very sure that the copolymerization with the additional polymerizable monomers is complete. If the residual monomer content is too high, difficulties may arise in deposition and in regard to pigment compatibility. Binding agents containing 30 to 50% by weight of copolymerized vinyl or vinylidene compounds are particularly suitable as air-drying coating materials. If copolymerization with α,β-ethylenically unsaturated monocarboxylic acids is carried out, then in this case larger proportions of vinyl and/or vinylidene compounds without carboxylic groups are preferably used in conjunction with these. The proportion of α,β-unsaturated monocarboxylic acids should generally not be more than 30% by weight with respect to the monomer mixture, because otherwise the end products that are produced tend to form gels and precipitations can occur relatively readily during manufacture.

In the copolymerization of α,β-ethylenically unsaturated dicarboxylic acids or partial esters of these, the reaction can also be carried out satisfactorily without the additional use of vinyl and/or vinylidene compounds containing no carboxylic groups. It is advantageous, however, more particularly when the dicarboxylic acids that are used are relatively strong acids, i.e. have pK values less than 4, to block all the hydroxyl groups of the polyether ester before the reaction with the polyethers, because otherwise esterification during the copolymerization process is not to be excluded. This blocking of the hydroxyl groups can be effected by reaction with acid anhydrides such as acetic anhydride or the like or by reaction with mono and/or polyisocyanates, for instance toluylene diisocyanates, which react readily with hydroxyl groups. This danger does not arise when less strongly acid α,β-ethylenically unsaturated carboxylic acids are used. The reaction of the polyether esters with the monomers containing the carboxylic groups for the purpose of copolymerization takes place in a heated state, preferably under the action of known polymerization catalysts, however, a thermal polymerization in the absence of catalysts may for special purpose be advantageous. The reaction temperatures depend on the catalyst system used. Reaction temperatures between 120° and 180° C. are preferred as the best range, in which case di-tertiary butyl peroxide is used and may be combined with chain stoppers, preferably lauryl mercaptan. If low temperatures, for instance about 120° C., are used, the reaction mixture is often too highly viscous for easy working. Also, the reaction speed, which can be followed by observing the solid content, is very slow in the case of many monomers. If high temperatures, for instance above 180° C., are used, products with a low viscosity are obtained even with purely themal copolymerization. It is advantageous, more particularly when α,β-ethylenically unsaturated dicarboxylic acids or anhydrides of these are used, to carry out the copolymerization without the use of a polymerization catalyst and purely by thermal action at 180° to 220° C. The reaction speed can be increased by the addition of cobalt (II) salts, for instance cobalt (II) chloride, in quantities of 3 to 6 parts per million. But the same reaction times are also achieved by the presence of stainless steel material. The reaction can also be carried out in suitable solvents. Suitable solvents for this purpose are water-soluble solvents, more particularly ethers of ethylene glycol such as ethylene-glycol-monoethylether, ethylene-gylcol-monoisopropyl-ether or ethylene-glycol-monobutyl-ether, but the resins made in these should be used only for the preparation of such coating media as are applied by mechanical means, for instance by spreading, spraying, dipping, rolling, brushing and the like. Solvents that are not capable of being thinned with water, for instance aromatic solvents such as xylene, toluene or benzene, can in fact also be used, but generally they must be removed again after the completion of the reaction. These solvents are preferred in the case of polymerization for the preparation of resins for electrophoretic deposition.

The vicosities of the reaction products when measured in a 1:1 by weight butyl glycol solution at 20° C. should be between 95 and 800 cp. This can be achieved firstly by suitable selection of the monomer mixture and also by control of the viscosity by the temperature and by the use of suitable solvents. The viscosity can also be further controlled by the addition of what are known as regulators as already explained previously. The reaction products are then converted to their salts by the addition of ammonia and/or strong organic nitrogen bases such as for instance trimethyl amine, triethanol amine, triisopropanol amine, diglycol amine, diethyl amine, piperidine, morpholine, diethanol amine, n-dimethylethanol amine, n-methylethanol amine and the like. The expression "strong organic nitrogen bases" is to be understood to include secondary or tertiary amines which attain a pH value of at least 9 in a 50% by weight aqueous solution. It is not necessary to neutralise the carboxylic groups of the reaction products completely; it is sufficient to add as much ammonia and/or amine as will make the products at least capable of being thinned with water. It is advantageous to carry out the operation of thinning with water in the presence of what are known as hydrophilic solvents. Suitable hydrophilic solvents for this purpose are for instance ethers of ethylene glycol such as ethylene-glycol-monoethyl-ether, ethylene - glycol - monoisopropyl-ether and ethylene-glycol-monobutyl-ether, and ethers of diethylene glycol such as diethylene glycol diethyl ether and diethylene glycol dimethyl ether, and also alcohols such as methanol, ethanol, propanole, butanols, secondary butanol, tertiary butanol and also ketone alcohols such as diacetone alcohol.

The invention also concerns the new water-thinnable vinyl-modified synthetic resins, based on polyether esters and made by the method of the invention, as such.

The invention also concerns the use of the new polyether ester resins in water-thinnable binding agents or coating agents, as sole binding agent or mixed with other binding agents, for stoving lacquers. A preferred use of the new polyether ester resins consists in their employment as sole binding agents or mixed with other binding agents in electrophoretically depositable coating materials. Another preferred embodiment consists in the use of the new synthetic resins as binding agents for air-drying coating materials.

The polyether ester resins used in accordance with the invention may be pigmented or unpigmented in coating agents and/or may contain fillers. They may for instance be applied to wood, metal, masonry, plaster or alternatively to iron and steel or alternatively to non-ferrous metals, with or without preliminary treatment such as passivation, phosphating, electrochemical treatment, galvanizing, tin-plating or other metallizing processes, by various methods including electrophoretic application. Pigments and/or fillers are for instance—the invention is not limited to these—iron oxide red, carbon black, lead silicochromate, strontium chromate, permanent white, micronized baryta, microtalc, colloidal chalk, diatomaceous earth, china clay, titanium dioxide, chromium oxide and others.

The use of strongly basic pigments such as zinc oxide, zinc chromate, lead carbonate, basic lead sulphate, minium or calcium plumbate, calls for accurate testing. These pigments may have a tendency towards thickening or precipitation. The polyether ester resins used in accordance with the invention can be stoved at a high temperature. When they are used as stoving lacquers, an admixture of water-soluble or at least hydrophilic low-molecular aldehyde condensation products, for instance phenol resols and/or aminoplast-forming condensation products, may be advantageous. Mixing the new water-soluble polyethers with relatively low-molecular, at least hydrophilic and heat-hardenable condensation products such as aminoplast-forming reaction products and/or phenol resols and/or etherified phenol resols causes further cross-linking of the stoved coating agents and therefore a further improvement of their lacquer properties such as hardness, lustre, protection against corrosion and the like.

The expression "heat-curing, hydrophilic condensation products" is to be understood to include those condensation products which when merely heated attain a relatively high-molecular but not yet unmeltable state. It is also not absolutely necessary that the condensation products added to the mixture should be water-soluble in and by themselves. It is only necessary that their hydrophilic nature should be sufficient to produce adequate compatibility in combination with the new water-soluble polyether ester acid resins which may have a compatibility, that is to say, stoved clear lacquer films must be homogeneous and even at the working concentration there must be no segregation of the binding agent components in the aqueous coating agents.

Examples of suitable heat-hardenable hydrophilic low-molecular condensation products are phenol alcohols and phenol polyalcohols, that is is to say products which still have a low-molecular weight and are obtained by condensation of mono- or polyhydric phenols with aldehydes such as formaldehyde, acetaldehyde, crotonic aldehyde, acrolein, benzaldehyde, furfurol and the like or compounds supplying formaldehyde such as paraformaldehyde, paraldehyde or trioxymethylene. A preferred aldehyde is formaldehyde or a compound which supplies formaldehyde and is obtained in an alkaline medium in a known way, for instance hexamethylene tetramine. Suitable phenols are phenol and phenols such as cresol or xylenol which are substituted in the o- or o'- and p-positions but are condensable with formaldehyde. Resols obtained from alkyl phenols such as propyl, butyl and more particularly p-tertiary butyl phenol, are very suitable. Resols from bicyclic phenols such as diphenol and Bisphenol A are also suitable. Those resols based on Bisphenol A which have about 1.75 to 2.5 moles of added formaldehyde per mole of Bisphenol A are particularly suitable. Phenolic resin carboxylic acids obtained by condensation of formaldehyde or compounds supplying formaldehyde with suitable phenol carboxylic acids can also be very satisfactorily used as resols, 4,4-bis(4-hydroxyphenyl)-valerianic acid and 4,4-bis(4-hydroxyphenyl)-acetic acid occupy a preferred position among the phenol carboxylic acids which are capable of condensation with formaldehyde. In this case also the best results are obtained if the compound contains 1.75 to 2.5 moles of formaldehyde per mole of phenol carboxylic acid. The manufacture of other suitable phenol carboxylic acid resols is described for instance in German patent publication 1,113,775. Phenol carboxylic acid resoles, particularly those based on 4,4-bis(4-hydroxyphenyl)-valerianic acid and 4,4-bis(4-hydroxyphenyl)-acetic acid are very suitable for combination with the products of this invention which are intended for use as electrophoretically depositable coating materials and lacquer binding agents. It is very advantageous to etherify at least a part of the formaldehyde condensation products with low monohydric aliphatic alcohols with 1 to 4 C atoms, such as ethanol, methanol, propanole or butanols. Preferred water-thinnable phenol resols are those which are obtained by reaction of phenol and aldehyde condensation products, etherified with alcohol, with aliphatic monoxy- or dioxycarboxylic acids or esters of these and are described in Belgian patent specification 724,923 of Dec. 4, 1968, respectively in the French patent specification 1,596,804 of June 22, 1970.

Suitable heat-hardenable hydrophilic low-molecular aminoplast-forming condensation products are aldehyde reaction products of such compounds capable of reacting with aldehydes as urea, ethylene urea, dicyandiamide and aminotriazines such as melamine, benzoguanamine, acetoguanamine and formoguanamine. The abovementioned compounds may be reacted with aldehydes such as formaldehyde, acetaldehyde, crotonic aldehyde, acrolein, benzaldehyde, furfurol and the like. The term "aldehydes" is to be understood to include aldehyde-forming compounds such as paraformaldehyde, paraldehyde and trioxymethylene. The preferred aldehyde is formaldehyde; preferred compounds combining with aldehydes are melamine and urea. The reaction takes place in the usual molar rations, for instance in the usual formaldehyde molar ratio of 1:1.5 to 1:4 in the case of urea resins and in a formaldehyde molar ratio between 1:15 and 1:6 in the case of melamine resins. The aminoplast-forming condensation products are preferably used in a partially or completely alkylated or alcohol-modified form. The products of etherification of the low semi-ethers of glycol and diglycol, such as ethylene-glycol-monoethylether and ethyl diglycol, with methylol melamine, as previously described in Austrian patent specification 180,407, have also proved satisfactory in the present case. The highest preference is given to low-molecular products of condensation of melamine with formaldehyde in a melamine/formaldehyde ratio between 1:4 and 1:6, which have been almost completely etherified with methanol. Other suitable compounds are ethers, partially esterified with dicarboxylic acids; of polymethylol compounds containing nitrogen, as obtained for instance by ester radical exchange reaction of hexamethoxymelamine with adipic acid.

We particularly prefer to use those water-thinnable melamine resin condensation products which are obtained when aminotriazine and aldehyde condensation products etherified with alcohol and containing at least one mole of volatile alcohol in the ether linkage are reacted by heating with aliphatic hydroxycarboxylic acid esters, and which have been described in French patent specification 1,544,219.

Preferred are combinations consisting of 90 to 70% by weight of new polyether ester carbonic acid resins in connection with aminoplastforming resp. phenoplastforming condensation products in quantities of 10 to 30% by weight based on the solid content.

When the resin combinations of this invention are used as binding agents for stoving lacquers, an advantageous effect is obtained by the addition of compounds containing hydroxyl groups, more particularly amines and preferably polyamines containing hydroxyl groups. In a particular embodiment the polyether ester resins of this invention contain in their aqueous solution as strong organic nitrogen bases at least one compound represented by the general formula

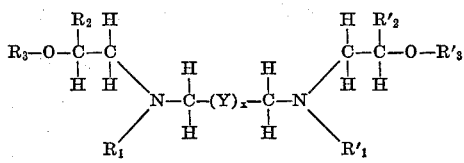

in which the substituents and symbols have the following meanings:

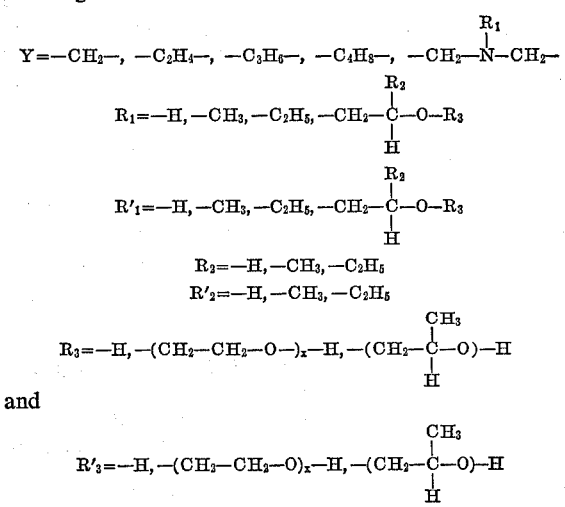

and $x$ means zero or a whole number between 1 and 6.

We prefer those polyhydroxypolyamines represented by the foregoing general formula which are characterized by complete replacement of the hydrogen atoms of polyamines by the 2-hydroxypropyl residue, more particularly the polyhydroxypolyamines obtained by complete reaction of diethylene triamine and diethylene tetramine with propylene oxide. The manufacture of the polyhydroxypolyamines referred to above is described in French patent specification 1,497,222.

The vinyl-modified polyethers of the invention can also be used for making air-drying lacquers. In this case it is necessary to add siccatives to the lacquer. Suitable siccatives are compounds of cobalt, manganese lead and the like which are known in lacquer manufacture. Those which are dispersible in water are preferred.

In practically all cases the air-drying lacquers may advantageously contain as an additional component at least one additive resin which is soluble in the lacquer system and is different from the oxidatively drying carboxylic acid resin and is of a kind usually employed with water-thinnable air-drying lacquers of this kind; compatibility has to be taken into consideration in the selection of the nature and quantity of this additive resin. In many cases it has been found advisable to mix the water-thinnable vinyl-modified polyether ester carboxylic acid-resins of this invention with a dispersion based on styrene and butadiene copolymers, vinyl acetate homopolymers and vinyl acetate copolymers or pure acrylate copolymers or a mixture of more than one of these. The quantitative relationships between the dispersion and the coating materials of the invention may be from 5 to 95 or from 95 to 5% by weight.

To the preferred forms put into practice according to this invention belong the following products of the process, namely resins of the following compositions:

(1) 40% by weight of a reaction product of ethanol with an epoxy resin on the basis of 4,4'-dioxidiphenylpropane with an epoxide equivalent weight of 450 to 550, 30% by weight of linseed oil fatty acid, 20% by weight of styrene and 10% by weight of acrylic acid.

(2) 40% by weight of a reaction product of ethanol with an epoxy resin mixture of 6% by weight of an epoxy resin on the basis of 4,4'-dioxidiphenylpropane with an epoxy equivalent weight of 190–220 and 4 parts by weight of an epoxy resin with an epoxy equivalent weight of 1800, 30% by weight of linseed oil fatty acid, 10% by weight of styrene, 10% by weight of 2-ethyl-hexylacrylate and 10% by weight of acrylic acid.

(3) 35% by weight of a reaction product of ethanol with an epoxy resin mixture of 6 parts by weight of an epoxy resin on the basis of 4,4'-dioxidiphenylpropan with an epoxy equivalent weight of 190–220 and 4 parts by weight of an epoxy resin with an epoxy equivalent weight of 1800, 35% by weight of ricinene fatty acid, 20% by weight of styrene and 10% by weight of acrylic acid.

(4) 35% by weight of a reaction product of n-butanol with a mixture of 7 parts by weight of an epoxy resin on the basis of 4,4'-dioxidiphenylpropan with an epoxy equivalent weight of 190 to 220 and 3 parts by weight of an epoxy resin on the basis of 4,4'-dioxidiphenylpropan with an epoxy equivalent weight of 1800, 35% by weight of tall oil fatty acid, 20% by weight of acrylonitrile and 10% by weight of acrylic acid.

(5) 40% by weight of a reaction product of iso-nonanol with a mixture of 4 parts by weight of an epoxy resin on the basis of 4,4'-dioxidiphenylpropan with an epoxy equivalent weight of 180–220 and 6 parts by weight of an epoxy resin on the base of 4,4'-dioxidiphenylpropan with an epoxy equivalent weight of 800–1100, 30% by weight of tall oil fatty acid, 20% by weight of vinyltoluene and 10% by weight of methacrylic acid.

(6) 30% by weight of a reaction product of n-butanol with an epoxy resin on the basis of 4,4'-dioxidiphenylpropan with an epoxy equivalent weight of 450–550, 60% by weight of linseed oil fatty acid and 10% by weight of maleic acid anhydride.

(7) 30% by weight of a reaction product of iso-nonanol with a mixture of 4 parts by weight of an epoxy resin on the basis of 4,4'-dioxidiphenylpropane with an epoxy equivalent weight of 180–220 and 6 parts by weight of an epoxy resin on the basis of 4,4'-dioxidiphenylpropane with epoxy equivalent weight of 800–1100, 30% by weight of tall oil fatty acid, 30% by weight of styrene and 10% by weight of acrylic acid.

(8) 40% by weight of a reaction product of iso-nonanol with a mixture of 4 parts by weight of an epoxy resin on the basis of 4,4'-dioxidiphenylpropan with an epoxy equivalent weight of 180–220 and 6 parts by weight of an epoxy resin on the basis of 4,4'-dioxidiphenylpropan with an epoxy equivalent weight of 800–1100, 33% by weight of tall oil fatty acid, 20% by weight of styrene and 7% by weight of methacrylic acid.

(9) 35% by weight of a reaction product of ethanol with an epoxy resin mixture of 6 parts by weight of an epoxy resin on the basis of 4,4' - dioxidiphenylpropan with an epoxy equivalent weight of 190–220 and 4 parts by weight of an epoxy resin with an epoxy equivalent weight of 1800, 35% by weight of linseed oil fatty acid, 20% by weight of 2-ethylhexylacrylate and 10% by weight of acrylic acid.

When using the polyetherester resins according to the invention as binders the following resin mixtures are preferred:

(10) The mixture of (a) 70 parts by weight of a resin of the following composition: 35% of a reaction product of ethanol with an epoxy resin mixture of 6 parts by weight of an epoxy resin on the basis of 4,4'-dioxidiphenylpropane with an epoxy equivalent weight of 190–220 and 4 parts by weight of an epoxy resin with an epoxy equivalent weight of 1800, 35% by weight linseed oil fatty acid, 20% by weight of 2-ethylhexylacrylate and 10% by weight of acrylic acid and (b) 30 parts by weight of a phenolic resin on the basis of 4,4'-dioxidiphenylpropane with a formaldehyde loading of about 2 moles.

(11) A mixture of (a) 70 parts by weight of a resin of the following combination: 35% of a reaction product of ethanol with an epoxy resin mixture of 6 parts by weight of an epoxy resin on the basis of 4,4'-dioxidiphenylpropan with an epoxy equivalent weight of 190 to 220 and 4 parts by weight of an epoxy resin with an epoxy equivalent weight of 1800, 35% by weight of linseed oil fatty acid, 20% by weight of ethylhexyl acrylate and 10% by weight of acrylic acid and (b) 30 parts by weight of a p.-tert.-butylphenol resol etherified with butanol.

(12) A mixture of (a) 80% by weight of a resin of the following combination: 35% of a reaction product of ethanol with an epoxy resin mixture of ethanol with an epoxy resin mixture of 6 parts by weight of an epoxy resin on the basis of 4,4'-dioxidiphenylpropan with an epoxy equivalent weight of 190 to 220 and 4 parts by weight of an epoxy resin with an epoxy equivalent weight of 1800, 35% by weight of linseed oil fatty acid, 20% by weight of 2-ethylhexyl acrylate and 10% by weight of acrylic acid and (b) 20 parts by weight of hexamethoxymethyl melamine.

The viscosities of all produced and used resins should be in the range of 110–180 cp. measured as a 50% by weight ethyleneglycolmonobutylether solution at 20° C.

EXAMPLE 1

500 g. of an epoxide resin obtained in a known manner by condensation of Bisphenol A with epichlorhydrin in an alkaline medium and having an epoxide equivalent weight of 450 to 525 and a softening point of 65 to 75° C. are dissolved in a mixture of 1000 g. of ethyl alcohol and 500 g. of xylene. To this solution is added a mixture of 100 g. of ethyl alcohol and 1 g. of a 40% ether solution of boron trifluoride. The solution is boiled under reflux for one hour. The solution is then concentrated in a vacuum until no further distillate passes over when the internal temperature is 140° C. 560 g. of fatty acid of linseed oil and 2 ml. of triphenyl phosphite are added to the residue. The material is heated to between 230 and 240° C. and kept at this reaction temperature until the acid value has fallen to 7. The resin is then thinned with the same quantity of ethyleneglycolmonoethylether. A mixture of 380 g. of styrene, 150 g. of acrylic acid, 20 g. of di-tertiary butyl peroxide and 5 g. of lauryl mercaptan is added to this solution at 140° C. during a period of 2.5 hours. The reacting material is kept at 140° C. until the solid content has reached 60% by weight (1 hour 110° C.) The material is concentrated under vacuum distillation until the solid content is 80% by weight. After neutralization with amines the resin can be thinned with water to an unlimited extent and is suitable as a binder with air-drying properties. A commercial use of the resin is as follows:

The resin obtained as in Example 1 is neutralized with concentrated ammonia solution and thinned with water so that the solid content is 40% by weight. The solution is siccativated with cobalt siccative (Cyclodex) containing 0.1% by weight of cobalt based on solid resin. A film applied with a layer thickness of 90μ to a glass plate is dry so that dust does ont adhere, within two hours. In the pigmented state the coating material is extremely suitable for anticorrosive primings and is distinguished by strong resistance to salt spray fog. The pH of the applied solution is 9.0. After storage for 21 days at 50° C. the pH value was 8.8. The drying properties of the product had not changed during this period.

EXAMPLE 2

The operation is carried out as in Example 1, but for polymerization the resin is thinned with xylene instead of ethyleneglycolmonoethylether. After the solid content of 60% by weight has been attained the xylene is completely removed by vacuum distillation and the resin is thinned with ethyleneglycolmonoethylether so that the solid content is 80% by weight. The resin is suitable as a binding agent for electrophoretic lacquering, whereby the bath shows special stability. A commercial use of the resin is as follows:

The resin obtained as in Example 2 is mixed with a phenolic resin ether carboxylic acid described in the Belgian patent specification 724,923 of Dec. 4, 1968, Example 22, in the ratio 7:3 based on solids. The manufacture of the phenol resin carboxylic acid is also described hereinafter. The resin mixture is neutralized with triethyl amine and thinned with water so that the solid content is 40% by weight. The paste is then ground in a ceramic ball mill with Kronos RN 59 (Titangesellschaft) titanium dioxide so that the pigment to binding agent ratio is 0.3:1. The paste is then thinned with water so that the solid content is 10% by weight. The solution is poured into a steel tank measuring 10 x 10 x 18 cm., in which passivated steel plates (Bonder 1024 Metallgesellschaft) are then coated by the application of direct current of 110 volts. The plates are then stoved for 30 minutes at 170° C., and extremely hard and resistant coatings are obtained.

Manufacture of the etherified phenol resol 686.5 g. of p-tertiary butyl phenol resol is dehydrated in a vacuum up to 90° C., and 1650.0 g. of n-butanol and 835.0 g. of toluene are then added. The mixture is heated to boiling point and the water is removed by azeotropic distillation, the solvent mixture being returned to the reaction container. After about 40 g. of water has been removed, 8.0 g. of 85% by weight phosphoric acid is added and the azeotropic distillation is continued until no more water passes over. The acid is the neutralized with calcium hydroxide added in solid form. The product is concentrated in a vacuum up to a temperature of 110° C. and then filtered. The solid content amounts to about 92% by weight.

Manufacture of the phenol resin carboxylic acid 340 g. of etherified phenol resol obtained as described above and 70 g. dimethylol propionic acid are mixed and heated in a vacuum to between 150 and 160° C., and kept at this temperature until about 100 g. of distillate (butanol) has passed over. The product then has a viscosity of 150 cp. when measured in a 1:1 butyl glycol solution at 20° C., and an acid value of 90. The product is thinned with isopropyl glycol so that the solid content is 80% by weight. The neutralized resin can be thinned with water to an unlimited extent when the pH is 8.5.

Another commercial use of the resin is as follows: The resin obtained as in Example 2 is mixed in the ratio 8:2 with an anionic melamine resin according to Example 2 as described in the published priority document of French patent specification 1,544,219, that is to say in German patent application R 45,195 IVd/12p. This mixture is pigmented as described in Example 2 of this invention and electrophoretically deposited as also described there. The plates are stoved for 30 minutes at 150° C. Relatively light coloured hard coatings are obtained.

Manufacture of the anionic melamine resin 390 g. of hexamethoxymethyl melamine,
150 g. of n-butanol and
140 g. of glycolic acid butyl ester are mixed and 0.1 g. p-toluene sulphonic acid is added as a catalyst. The mixture is heated and kept at 100 to 110° C. until no more distillate passes over. Vacuum is then applied and the unreacted alcohol and ester are distilled off. 100 ml. of 5 N NaOH and 100 ml. of water are then added. The material is boiled under reflux for one hour. The water is then removed by azeotropic distillation with benzene as a carrier. The benzene is then distilled off under vacuum and a solution of 30 g. of oxalic acid in 100 g. of acetone is added to the mixture at 30° C. The material is thoroughly stirred and then filtered. The resin is then neutralized with triethyl amine. It can be thinned with water to an unlimited extent and can be used for electrophoretic lacquering.

While this invention has been described with reference to certain specific embodiments, it will be recognized by those skilled in the art that many variations are possible without departing from the scope and spirit of the invention.

I claim:
1. A method of making a water dilutable vinyl modified synthetic resin, based on polyether esters characterised by etherifying
   (a) compounds which contain epoxide groups and which may also contain hydroxyl groups and are represented by the general formula:

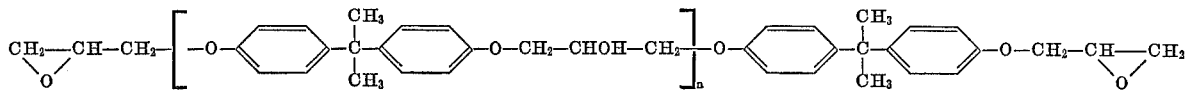

in which $n$ means the integer from 1 to 5 with
   (b) compounds selected from the group consisting of saturated primary and secondary monohydric aliphatic alcohols having 3 to 20 carbon atoms, individually or in a mixture by heating and
   (c) esterifying the etherification products with an unsaturated aliphatic monocarboxylic acid with 6 to 20 C. atoms and
   (d) reacting the esterification products by heating with such quantities of compounds selected from the group consisting of $\alpha,\beta$-ethylenically unsaturated mono- and polycarboxylic acids and, when they exist, anhydrides of these acids and semi-esters obtained by reaction of these acids with monoalcohols having 1 to 4 C-atoms, individually or in a mixture, in the presence of other vinyl or vinylidene compounds, that the reaction products have an acid value of at least 25, and
   (e) subsequently treating the reaction products containing carboxyl groups with such quantities of basic compounds selected from the group consisting of ammonia and strong organic nitrogen bases that the products are completely or partially neutralized and are sufficiently capable of being dispersed in water or thinned with water.

2. A water-dilutable vinyl-modified synthetic resin based on polyether esters when prepared in accordance with the method of claim 1.

3. A method according to claim 1 wherein the etherification of step (b) takes place in the presence of a catalyst.

4. A method according to claim 1 wherein the residual hydroxyl groups of the esterification products of step (c) are blocked with compounds selected from the group consisting of acid anhydrides, mono- and polyisocyanates.

References Cited

UNITED STATES PATENTS

| | | | |
|---|---|---|---|
| 3,563,929 | 2/1971 | Guldenpfennig | 260—23 |
| 3,264,370 | 8/1966 | Ott et al. | 260—834 |
| 3,502,557 | 3/1970 | Yurcheshen et al. | 204—181 |
| 3,563,926 | 2/1971 | Lackner | 260—19 |

DONALD E. CZAJA, Primary Examiner

R. W. GRIFFIN, Assistant Examiner

U.S. Cl. X.R.

117—124 E, 132 BE, 161 UN, 161 ZB, DIG. 7; 204—181; 260—18 EP, 19 EP; 21, 22 EP, 22 CB, 23 TN, 29.2 EP, 29.2, TN, 29.2 UA